United States Patent [19]
Marshall

[11] Patent Number: 6,099,777
[45] Date of Patent: *Aug. 8, 2000

[54] METHOD FOR CUTTING OPENINGS IN A SHEET OF CONTAINERS

[76] Inventor: Craig A. Marshall, 9470 County Hwy., C.H. 134, Nevada, Ohio 44849

[ * ] Notice: This patent issued on a continued prosecution application filed under 37 CFR 1.53(d), and is subject to the twenty year patent term provisions of 35 U.S.C. 154(a)(2).

[21] Appl. No.: 08/872,861

[22] Filed: Jun. 11, 1997

Related U.S. Application Data

[60] Provisional application No. 60/019,605, Jun. 11, 1996.

[51] Int. Cl.$^7$ .............................. B23D 1/00; B29C 51/00
[52] U.S. Cl. .............................. 264/154; 83/869; 83/914; 83/946; 264/544; 264/553; 409/293; 409/301
[58] Field of Search ..................................... 264/544, 553, 264/154, 161; 425/388, 315, 302.1, 292; 83/946, 914, 465, 869, 578; 409/301, 297, 303, 293

[56] References Cited

U.S. PATENT DOCUMENTS

| | | | |
|---|---|---|---|
| 3,429,211 | 2/1969 | Perlot | 425/315 |
| 3,816,017 | 6/1974 | Corban . | |
| 3,908,879 | 9/1975 | King, Jr. | 225/103 |
| 4,173,913 | 11/1979 | Nicholson . | |
| 5,123,984 | 6/1992 | Allport et al. | 264/154 |
| 5,353,930 | 10/1994 | Berry, Jr. | 264/553 |
| 5,474,728 | 12/1995 | Castner et al. . | |
| 5,624,369 | 4/1997 | Bidlack et al. . | |

OTHER PUBLICATIONS

Machining of Plastics, pp. 1–3, 12–17, 143–149, Kobayashi, McGraw–Hill (1967) Industrial Plastics, pp. 157–165, Baird, Goodheart–Willcox (1986) Plastics Film Technology, pp. 170–175, Park, Van Nostrand Reinhold (1969).

*Primary Examiner*—Jan H. Silbaugh
*Assistant Examiner*—Edmund H. Lee
*Attorney, Agent, or Firm*—MacMillan, Sobanski & Todd, LLC

[57] ABSTRACT

A method for cutting openings in a sheet of thermoformed containers. The sheet of containers is indexed into a cutting assembly. The cutting assembly includes a shear plate having a plurality of openings formed therethrough, and having an upper surface which defines a cutting plane. A locating means including a plurality of anvils is raised so that the anvils enter the containers and raise the sheet toward the shear plate. The end portions of the containers are located within the openings of the shear plate, and a portion of the containers is positioned in the cutting plane. The cutting assembly includes a blade mounted on piston/cylinder assembly for sliding movement along the upper surface of the shear plate. The cylinder is actuated to move the blade along the cutting plane. The blade cuts off the portion of the containers and creates an opening in the containers.

22 Claims, 8 Drawing Sheets

METHOD FOR CUTTING OPENINGS IN A SHEET OF CONTAINERS

CROSS-REFERENCE TO RELATED APPLICATION

This application claims the benefit of U.S. Provisional Application No. 60/019,605, filed Jun. 11, 1996.

BACKGROUND OF THE INVENTION

This invention relates in general to cutting equipment, and in particular to a cutting assembly and method for cutting openings in a sheet of thermoformed containers or cells.

Thermoforming is the conversion of a plastic sheet into a shaped article by heating the sheet, placing the sheet in a mold, and applying vacuum and/or pressure so that the sheet conforms to the shape of the mold. Many different types of articles can be made by thermoforming, including various types of containers and cells. For example, thermoformed containers are often used for holding produce such as strawberries. Thermoformed horticultural trays include cells for holding bedding plants and other horticultural products. The containers and cells for produce, horticultural products and similar products are sometimes provided with openings for air circulation and liquid drainage.

When thermoformed containers and trays are made for holding produce, horticultural products and similar products, a plurality of containers or cells are usually formed in a single sheet. Then, individual openings are created in each of the containers or cells formed in the sheet. One conventional method of creating the openings is to use a punch and die apparatus. However, the cost of creating the openings with a punch and die apparatus is undesirably high. Another conventional method is to burn the openings in the containers or cells. However, burning the plastic sheet presents safety issues and produces undesirable fumes.

Therefore, it would be advantageous to provide a cutting assembly and method for cutting openings in a sheet of thermoformed containers or cells which is less costly than the conventional punch and die method. It would also be advantageous to provide a cutting assembly and method which does not present safety or environmental issues.

SUMMARY OF THE INVENTION

This invention relates to a method for cutting openings in a sheet of thermoformed containers or cells. The sheet of containers or cells is indexed into a cutting assembly. The cutting assembly includes a shear plate having a plurality of openings formed therethrough, and having an upper surface which defines a cutting plane. A locating means including a plurality of anvils is raised so that the anvils enter the containers or cells and raise the sheet toward the shear plate. The end portions of the containers or cells are located within the openings of the shear plate. A portion of the containers or cells, such as a protrusion, is positioned in the cutting plane. The cutting assembly includes a blade mounted on a piston/cylinder assembly for sliding movement along the upper surface of the shear plate. The cylinder is actuated to move the blade along the cutting plane. The blade cuts off the protrusion of the containers or cells and creates an opening in the containers or cells. The velocity of the blade is adjustable and will vary with opening design and the material being cut. The openings are cut with good quality on a consistent basis, and without distorting the containers or cells formed in the sheet. The cutting assembly provides a cost effective method of creating openings in the sheet of containers or cells. The method does not present safety or environmental issues.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
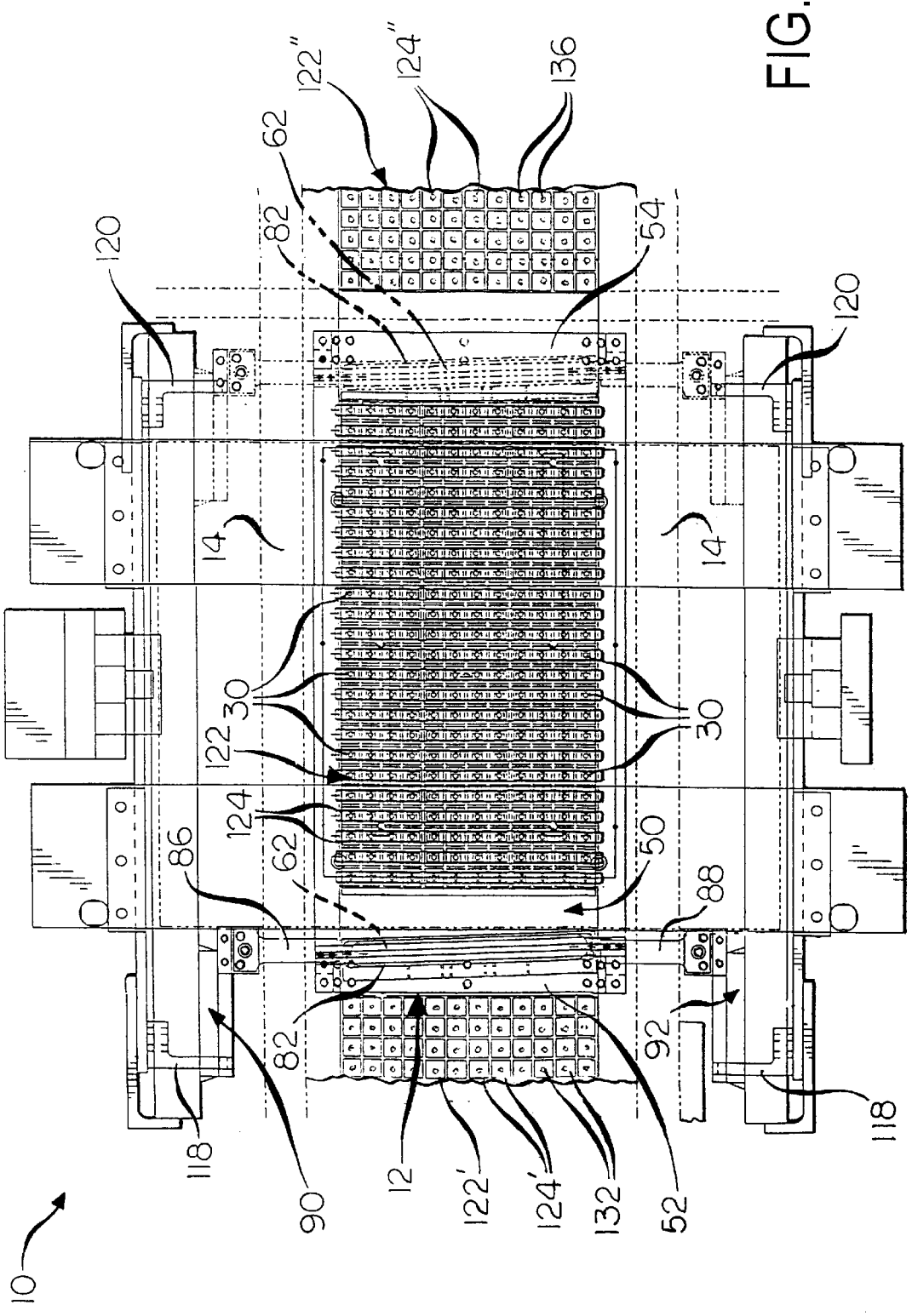
FIG. 1 is a plan view of a cutting station of a thermoforming machine, including a cutting assembly according to the invention.

Preliminarily, it should be noted that certain terms used herein, such as "upper", "lower", "top", "bottom", "left", "right", "front", "rear", and "side", are used to facilitate the description of the preferred embodiment of the invention and are not intended as a limitation on the orientation of the cutting assembly and its parts. It is contemplated that the cutting assembly may be mounted for cutting in any direction, such as horizontally or vertically.

The term "containers" will be used herein to refer to containers, cells, and any other type of cavity which is formed in a sheet. The invention is not limited to creating openings in individual containers, but it can also be used for creating openings in several cells which are formed in a tray cut from the sheet, or in a plurality of cells formed throughout the sheet.

The term "openings" will be used herein to refer to openings of any shape and size. The openings are not necessarily round, but can be oval, rectangular, irregular-shaped, or any desired shape. The openings can be shaped as slits as well as holes.

Referring now to the drawings, there is illustrated in FIGS. 1 through 4 a cutting station 10 of a thermoforming machine. The cutting station 10 includes a cutting assembly 12 according to the invention, which will be described in detail below. Advantageously, the cutting assembly 12 of the invention is designed to be integrated into a conventional thermoforming machine suitable for producing thermoformed containers. A preferred thermoforming machine includes sequential stations to produce thermoformed containers in a continuous operation. The thermoforming machine includes a heating station (not shown) with an oven for heating a plastic sheet, and a forming station (not shown) with a mold for thermoforming containers in the sheet. The heating and forming stations are positioned before the cutting station 10 shown in FIG. 1. The thermoforming machine also includes a trimming station (not shown) positioned after the cutting station 10, for cutting the thermoformed sheet into individual containers and trimming excess plastic from the containers. The thermoforming machine includes an indexing mechanism such as a pair of chain rails 14 for indexing the sheet between the different stations.

The thermoforming machine includes an upper platen 16 and a lower platen 18. The lower platen 18 is adapted to be raised and lowered relative to the upper platen 16 by pneumatic, hydraulic or mechanical means. The cutting assembly 12 includes a pair of mounting plates 20 positioned along the sides of the upper platen 16 and lower platen 18.

The cutting assembly 12 also includes a locating means for locating and supporting a sheet of containers in cutting position during the cutting operation. In the illustrated embodiment, the locating means is an anvil assembly 22 which is mounted on the lower platen 18. The anvil assembly 22 includes a base plate 24, an anvil mounting plate 26 disposed above and generally parallel with the base plate 24, and risers 28 supporting the anvil mounting plate 26 above the base plate 24.

Figure 6:
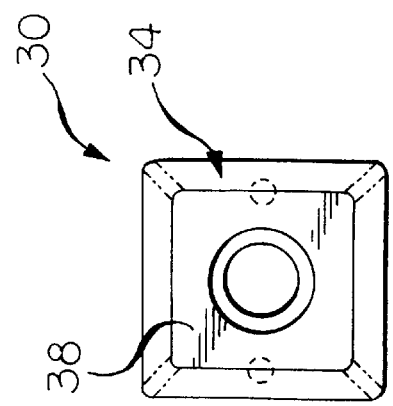
FIG. 6 is a plan view of the anvil.
Figure 5:
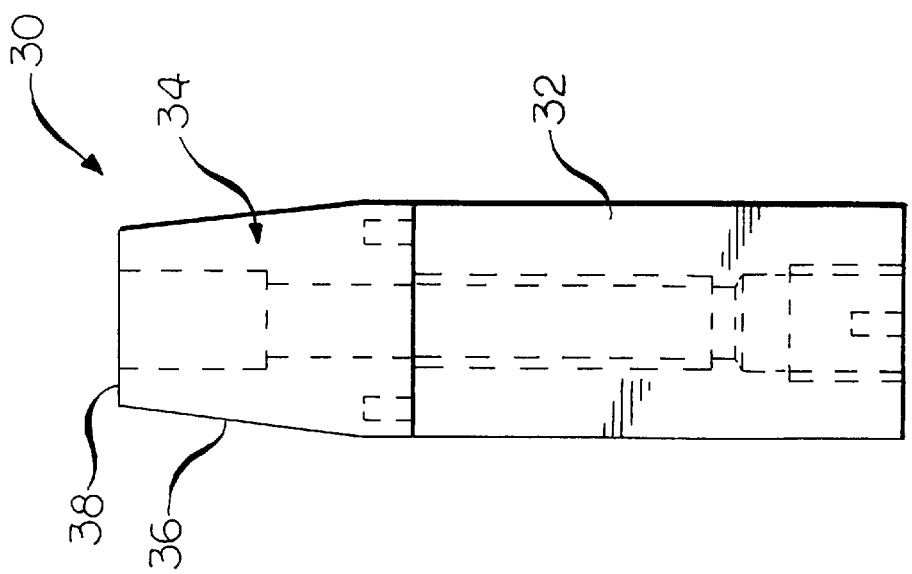
FIG. 5 is a side view of an anvil of the cutting assembly.

The anvil assembly 22 further includes a plurality of anvils 30 mounted on the upper surface of the anvil mounting plate 26. The anvils 30 function as locating members for locating and supporting the containers in cutting position. The anvils 30 can be any shape such as square or round in cross section, and they are preferably shared to conform to the shape of the containers. The anvil 30 illustrated in FIGS. 5 and 6 includes a lower base 32 which is preferably formed of a metallic material such as steel, and a upper tip 34 which is preferably formed of a plastic material such as nylon. The nylon tip 34 conforms very well to the container. The tip could also be formed integrally with the base. The tip 34 includes an upper portion 36 with a generally planar upper end surface 38.

Figure 2:
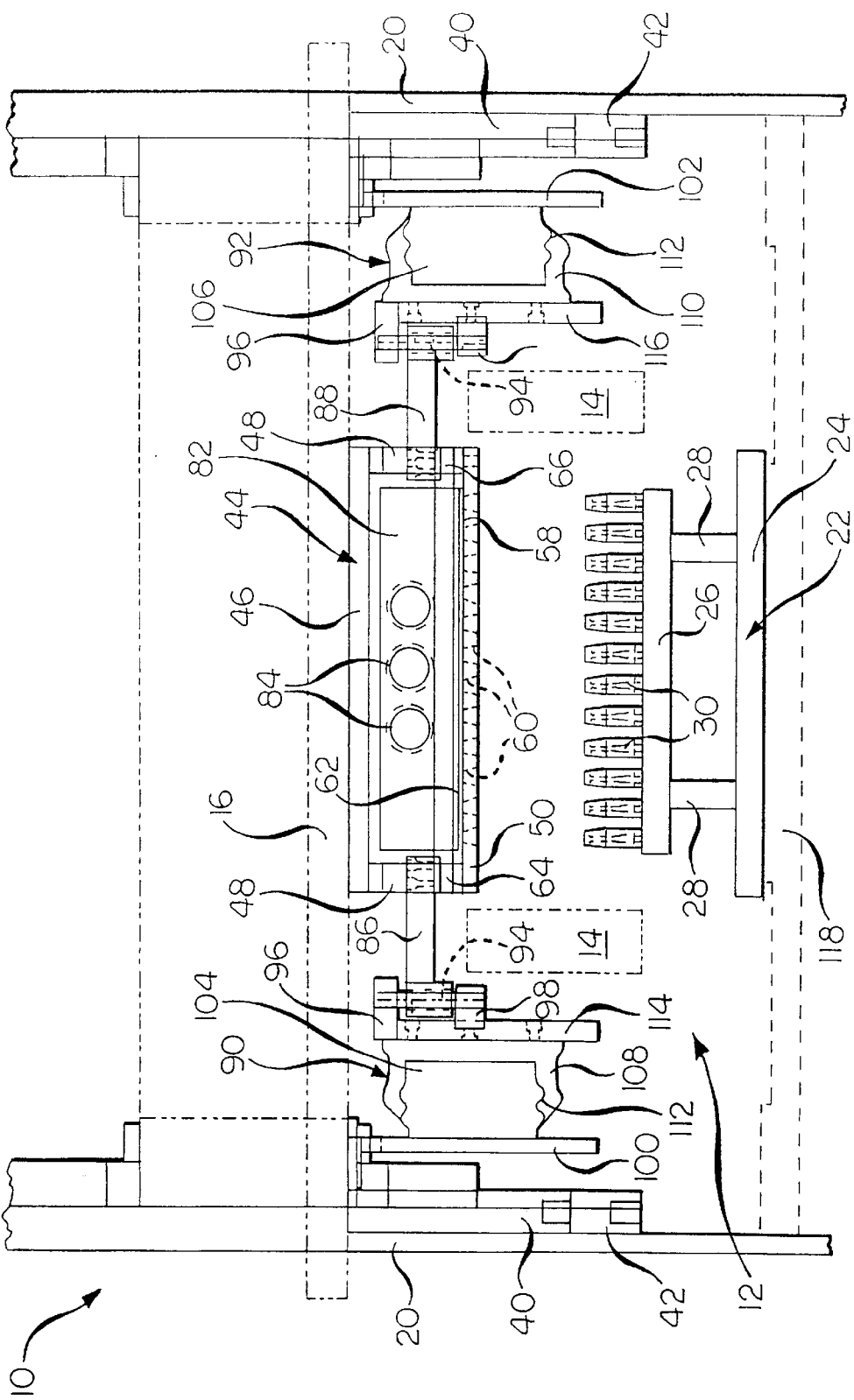
FIG. 2 is a front view of the cutting station of FIG. 1, showing the locating means of the cutting assembly in a lowered position.
Figure 3:
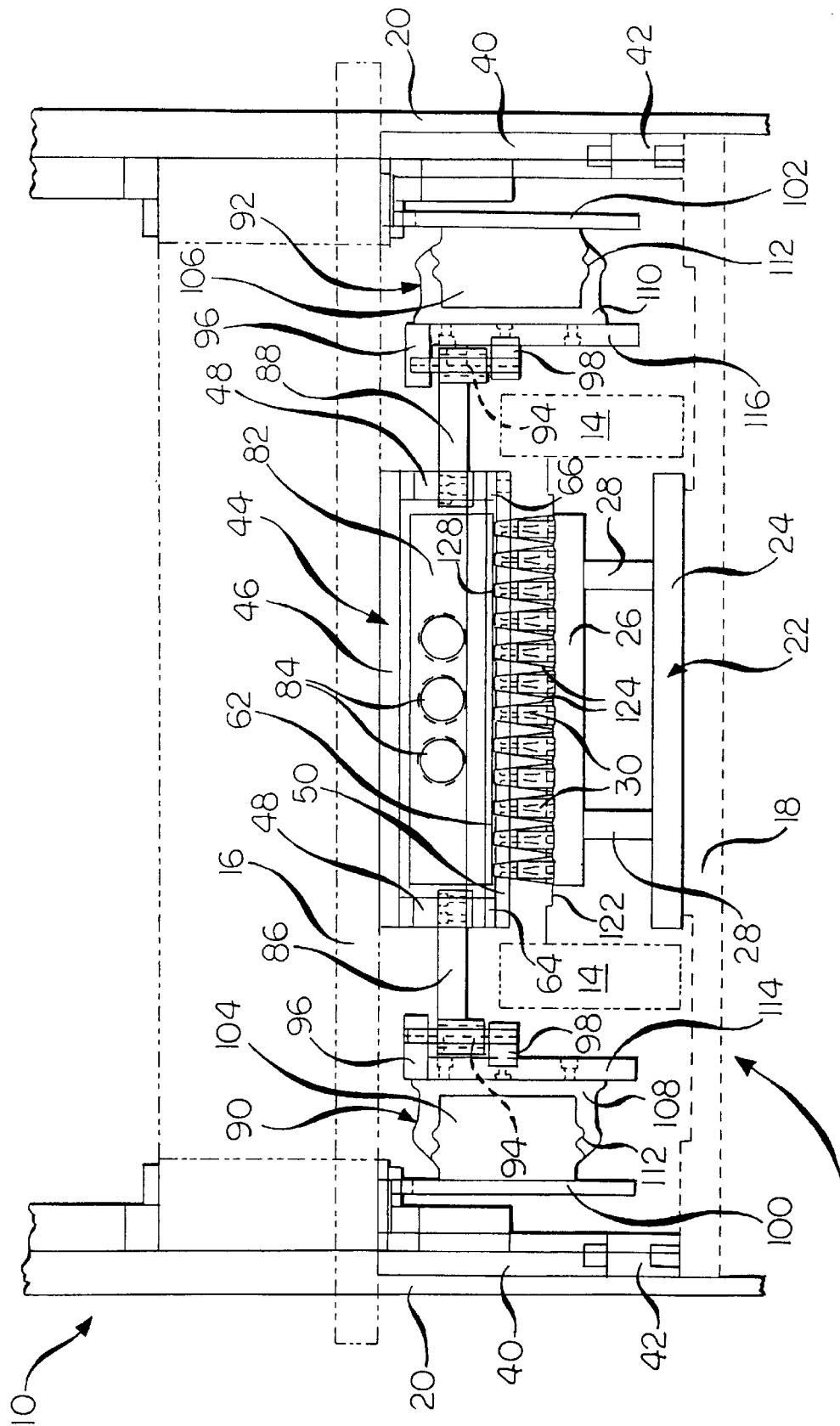
FIG. 3 is a view as in FIG. 2, showing the locating means of the cutting assembly in a raised position, and a sheet of containers located in cutting position by the locating means.
Figure 4:
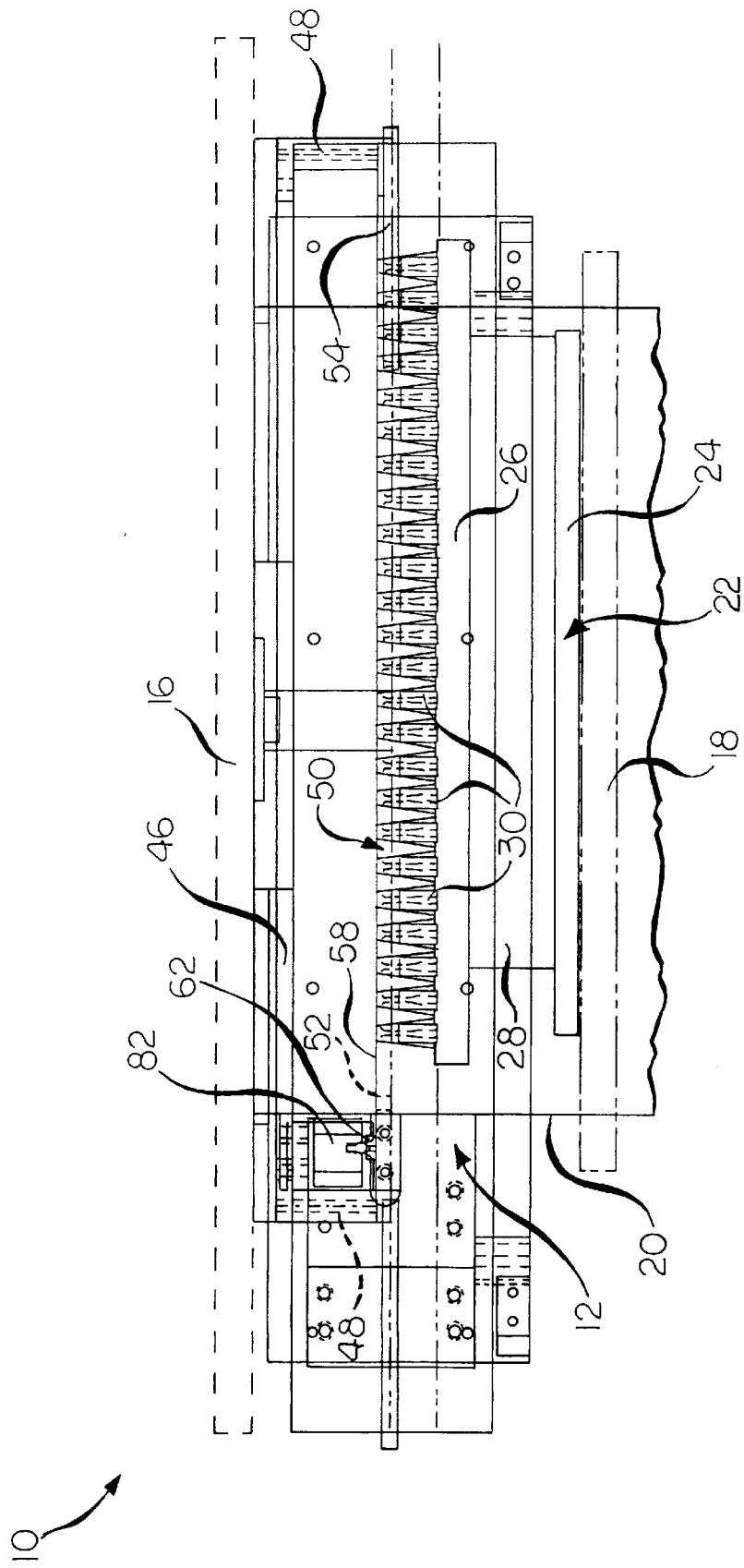
FIG. 4 is a side view of the cutting station of FIG. 1.

The anvil assembly 22 can be raised and lowered relative to the upper platen 16 by raising and lowering the lower platen 18. FIG. 2 shows the anvil assembly 22 in a lowered position, while FIG. 3 shows the anvil assembly 22 in a raised position. The cutting assembly 12 includes stops 40 and stop adjusters 42 for controlling and adjusting the height to which the anvil assembly 22 can be raised. As will be described below, the anvil assembly 22 is raised to pilot the sheet of containers to a cutting position.

A shear plate assembly 44 is mounted below the upper platen 16. The shear plate assembly 44 includes a generally rectangular top support plate 46 which is attached to the upper platen 16. Shear plate mounting brackets 48 are attached to the corners of the top support plate 46, and extend downward therefrom. A shear plate 50 is supported below the top support plate 46 by the shear plate mounting brackets 48. The shear plate 50 has a front end 52 and a rear end 54 (FIG. 1).

Figure 7:
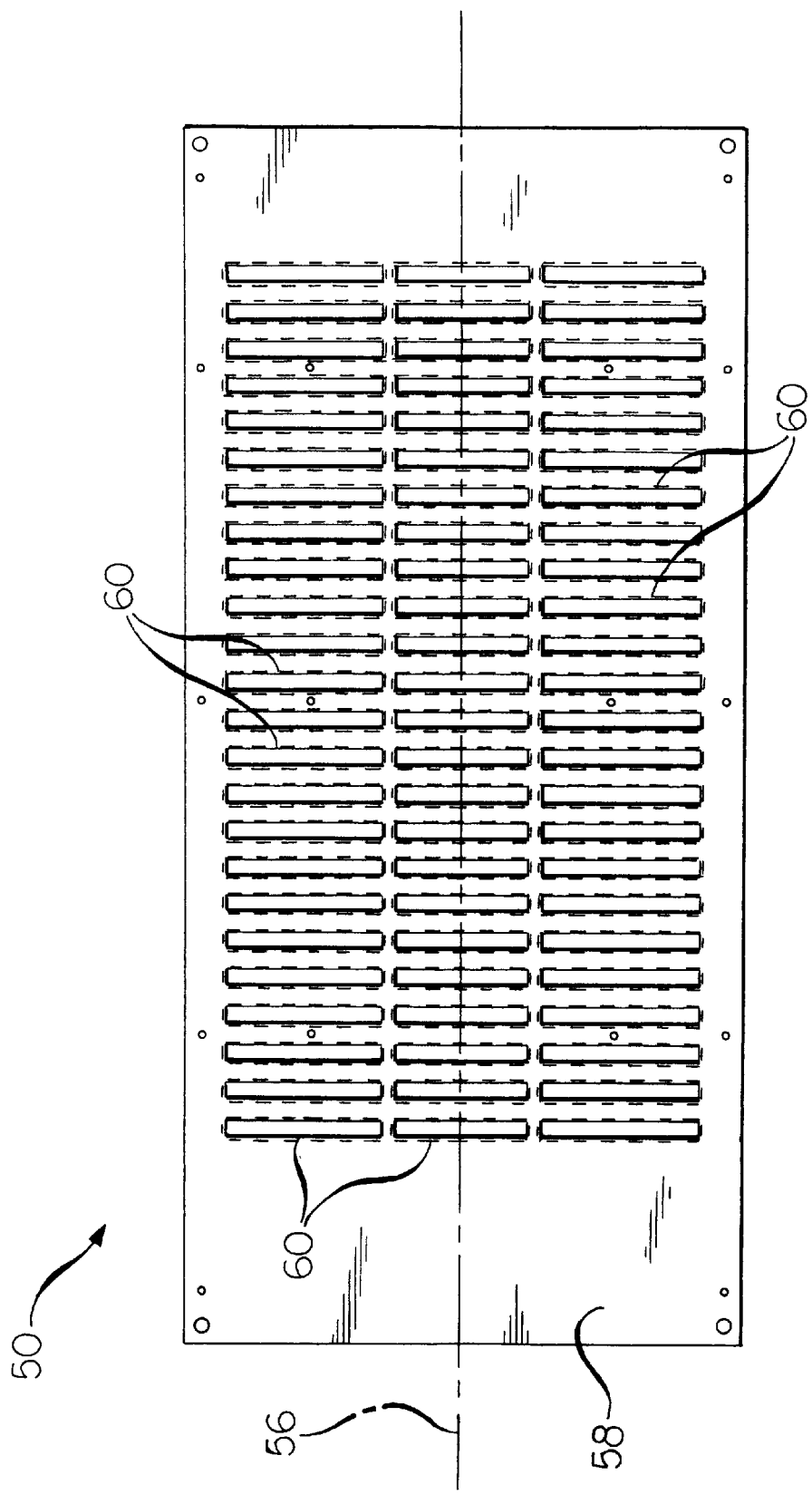
FIG. 7 is a plan view of a shear plate of the cutting assembly.

As shown in FIG. 7, the shear plate 50 is generally rectangular in shape and is elongated along a longitudinal axis 56. The shear plate 50 extends generally parallel with the top support plate 46 and upper platen 16. The shear plate 50 has an upper cutting surface 58 which defines a cutting plane. The anvil assembly 22 is adapted for movement generally perpendicular to the cutting plane. The cutting surface 58 of the shear plate 50 is located at a "zero cutting height position".

Figure 11:
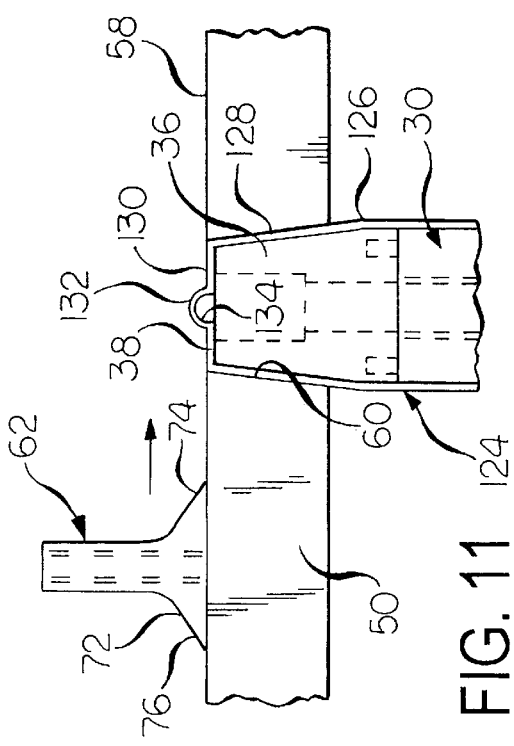
FIG. 11 is a side cross-sectional view of a container supported by an anvil in an opening of the shear plate, and a blade moving along the cutting surface of the shear plate toward a protrusion on the container.

The shear plate 50 has a plurality of openings 60 formed therethrough. The cutting assembly 12 is constructed so that the openings 60 of the shear plate 50 are vertically aligned with the anvils 30 of the anvil assembly 22. As shown in FIG. 11, the openings 60 are sized to receive the upper portions 36 of the anvils 30 with a small amount of clearance therebetween. Preferably, each opening 60 is sized to receive several adjacent anvils 30. The openings 60 are shaped to conform to the shape of a container or several adjacent containers.

When the anvil assembly 22 is in the raised position illustrated in FIGS. 3 and 11, the upper portions 36 of the anvils 30 are received within the openings 60 of the shear plate 50. The upper end surfaces 38 of the anvils 30 are located generally adjacent to, and extend generally parallel with, the cutting plane defined by the cutting surface 58 of the shear plate 50. When the anvil assembly 22 is in the lowered position illustrated in FIG. 2, the anvils 30 are positioned away from the shear plate 50.

Figure 8:
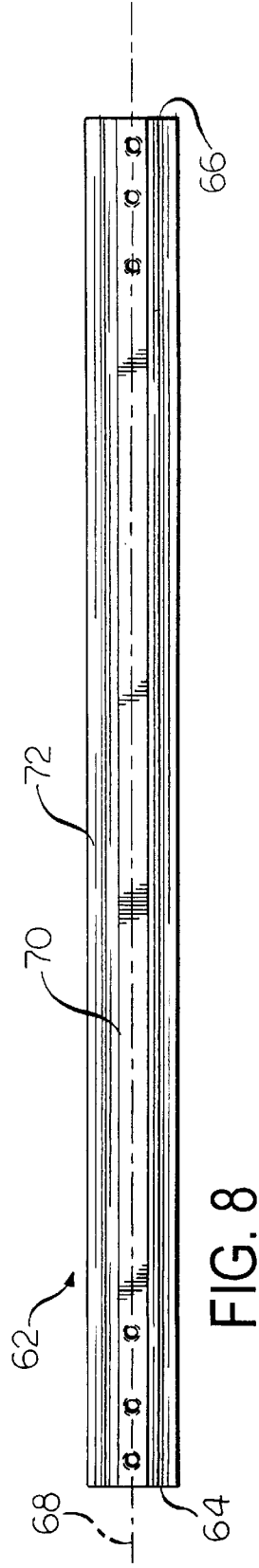
FIG. 8 is a plan view of a blade of the cutting assembly.
Figure 9:
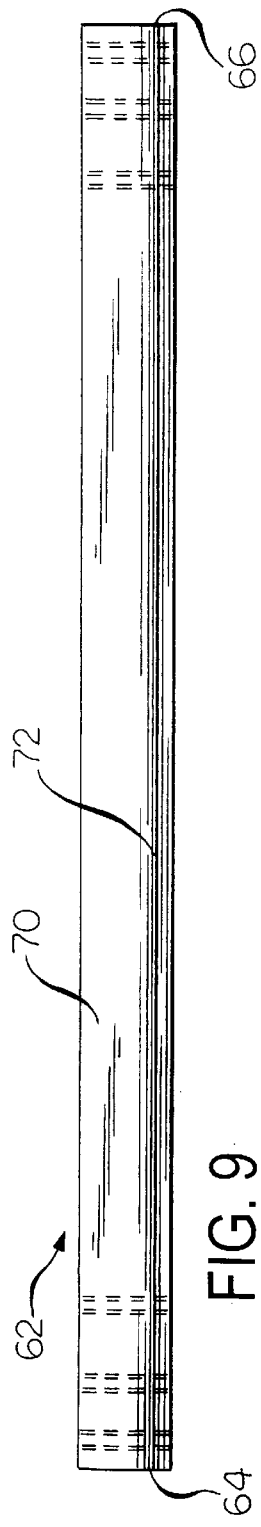
FIG. 9 is a front view of the blade.
Figure 10:
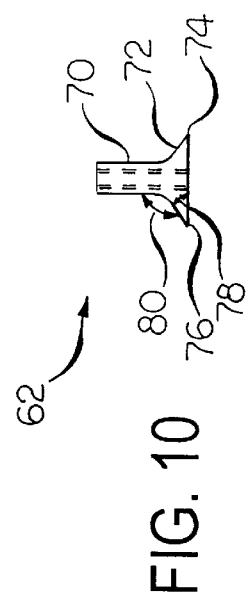
FIG. 10 is a side view of the blade.

A blade 62 is mounted above the shear plate 50. The blade 62 includes left and right ends 64, 66. Preferably, the length of the blade 62 is about the same as the width of the shear plate 50. As shown in FIGS. 8 through 10, the blade 62 is thin and elongated along a longitudinal axis 68. The longitudinal axis 68 of the blade 62 is disposed at a slight angle from perpendicular relative to the longitudinal axis 56 of the shear plate 50, preferably an angle between about 1° and about 5°. Positioning the blade 62 at the slight angle from perpendicular creates a shear which reduces the amount of force necessary to cut openings in the containers.

The blade 62 has an upper portion 70 which is generally rectangular in cross section, and a lower cutting portion 72 which is generally triangular in cross section. The cutting portion 72 includes both front and rear cutting edges 74, 76, so that the blade 62 can cut in both the forward and rearward directions. The ability of the blade 62 to cut in both directions increases the efficiency of the cutting assembly 12 and increases the life of the blade. The cutting edges 74, 76 are usually formed at an angle 78 between about 15° and about 45°, which is the preferred angle for cutting and separating a portion of the container from the sheet. The angle 80 between the cutting edges 74, 76 and the upper portion 70 of the blade 62 is usually between about 105° and about 135°, which is the preferred angle for carrying the cut portion up and away from the blade.

A vacuum box 82 is mounted on the upper portion 70 of the blade 62 to collect the cut portions of the containers. The vacuum box 82 is connected to a vacuum source (not shown) by one or more vacuum ports 84. Alternatively, the cutting assembly 12 can include a blower (not shown) to blow the cut portions out of the assembly.

The blade 62 is held in position above the shear plate 50 by a pair of blade holders. In particular, the left end 64 of the blade 62 is attached to a left blade holder 86, and the right end 66 of the blade is attached to a right blade holder 88. The blade 62 is held so that the front and rear cutting edges 74, 76 are retained down on the cutting surface 58 of the shear plate 50. The left and right blade holders 86, 88 are mounted, respectively, on left and right cylinder side rail assemblies 90, 92. In a preferred embodiment, the blade holders 86, 88 are slidably mounted on vertical rods 94 between upper and lower flanges 96, 98 on the cylinder side rail assemblies 90, 92. A set screw and spring (not shown) can be positioned between the upper flanges 96 and the blade holders 86, 88 to adjust the tension of the blade 62 on the shear plate 50.

The cylinder side rail assemblies 90, 92 include left and right side rails 100, 102 attached to the mounting plates 20. The side rails 100, 102 extend along the length of the cutting assembly 12 on both sides of the shear plate 50. The cylinder side rail assemblies 90, 92 further include left and right pneumatic cylinders 104, 106 which extend along the length of the side rails 100, 102. Pneumatic hoses (not shown) connect the cylinders 104, 106 to a supply of pressurized air.

Left and right pistons 108, 110 are slidably mounted on the cylinders 104, 106 by any suitable means, such as ball bearing guides 112. Left and right carriages 114, 116 are attached to the pistons 108, 110, and the blade holders 86, 88 are mounted on the carriages. A preferred pneumatic cylinder/piston assembly is a NUMATICS Fully Guided Rodless Cylinder with Integrated Ball Bearing Guides, available from Numatics Corp., 1450 N. Milford Rd., Highland, Mich. 48357.

When the cylinders 104, 106 are actuated by supplying them with pressurized air, the pistons 108, 110 are forced to slide along the length of the cylinders. The cylinders 104, 106 can be actuated to force the pistons 108, 110 to move in both the forward and rearward directions. In this manner, the attached blade 62 is adapted for reciprocating sliding movement along the length of the cutting surface 58 of the shear plate 50. The cutting assembly 12 includes front and rear cushion stops 118, 120 to limit the forward and rearward movement of the pistons 108, 110 and the attached blade 62.

In operation, the anvil assembly 22 of the cutting assembly 12 is moved to the lowered position illustrated in FIG. 2. Then a sheet of containers is indexed from the forming station of the thermoforming machine into the cutting assembly. FIG. 1 illustrates a first sheet 122' of containers 124' prior to entry into the cutting assembly 12, and a second sheet 122 of containers 124 which has been indexed into the assembly. The sheet 122 is positioned within the cutting assembly 12 so that the containers 124 are vertically aligned with the anvils 30 of the anvil assembly 22.

The lower platen 18 is then actuated to move the anvil assembly 22 upward toward the sheet 122 of containers 124. The anvils 30 of the anvil assembly 22 enter the containers 124 formed in the sheet 122. The anvils 30 do not distort the containers 124 when entering. Each of the containers 124 defines a cavity in the sheet 122, and each of the containers is supported by an anvil 30 which extends into the cavity. As shown in FIG. 11, each of the containers 124 includes a side surface 126 with an end portion 128, and a closed end surface 130. When a container 124 is supported on an anvil 30, the end portion 128 of the container rests on the upper portion 36 of the anvil, and the closed end surface 130 of the container rests on the upper end surface 38 of the anvil.

The cutting assembly 12 of the invention is adapted for cutting off a portion of a container to create an opening in the container. As will be described below, any desired portion of the container can be cut off to create an opening. In the illustrated embodiment, the container 124 includes an outwardly extending nub or protrusion 132 formed on the closed end surface 130. The protrusion 132 was formed during the thermoforming operation. The protrusion 132 has a base 134 which is disposed adjacent to the closed end surface 130.

The anvil assembly 22 continues moving upward to the raised position illustrated in FIG. 3. The anvil assembly 22 pilots the sheet 122 of containers 124 to a cutting position. As shown in FIG. 11, each of the containers 124 is located by an anvil 30 so that the closed end surface 130 of each container is disposed adjacent to the cutting plane defined by the cutting surface 58 of the shear plate 50. The base 134 of the protrusion 132 of each container 124 is located in the cutting plane, at the zero cutting height position.

With the sheet 122 of containers 124 located in cutting position, the cylinders 104, 106 are actuated by supplying them with pressurized air, usually at a pressure between about 20 psi and about 50 psi. This causes the pistons 108, 110 to slide along the lengths of the cylinders 104, 106, and the attached blade 62 to slide along the length of the shear plate 50. As shown in FIG. 1, the blade 62 moves from a first position at the front end 52 of the shear plate 50, to a second position (shown in phantom) at the rear end 54 of the shear plate 50.

Figure 12:
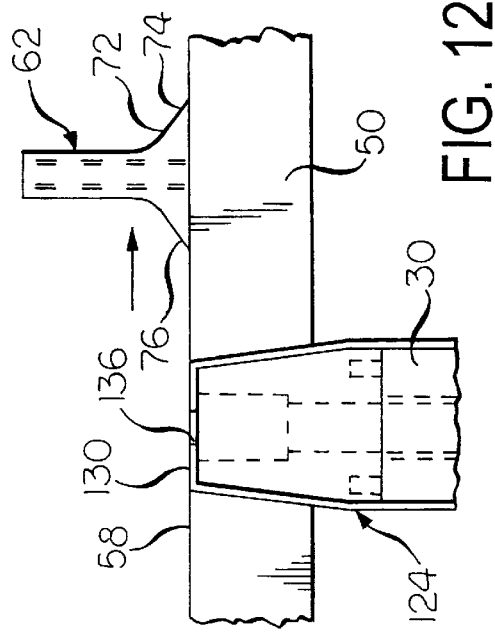
FIG. 12 is a view as in FIG. 11 where the blade has cut off the protrusion to create an opening in the container.

As shown in FIGS. 11 and 12, the blade 62 moves in a path along the cutting surface 58 of the shear plate 50 at the zero cutting height position. The closed end surface 130 of each container 124 is located adjacent to the cutting surface 58, and the base 134 of the protrusion 132 of each container 124 is located at the zero cutting height position. When the blade 62 moves over the container 124, the front cutting edge 74 of the blade cuts through the base 134 of the protrusion 132. In this manner, the blade 62 cuts off the protrusion 132 and creates an opening 136 in the closed end surface 130 of the container 124. The cut off protrusion 132 is collected by the vacuum box 82.

After the cutting operation, the anvil assembly 22 of the cutting assembly 12 is moved to the lowered position illustrated in FIG. 2. Then the sheet 122 of containers 124 is indexed out of the cutting assembly 12, and another sheet of containers is indexed into the cutting assembly from the forming station. Because the blade 62 is adapted for cutting in both the forward and rearward directions, the blade does not have to be returned to its original position for cutting the next sheet of containers.

Figure 13:
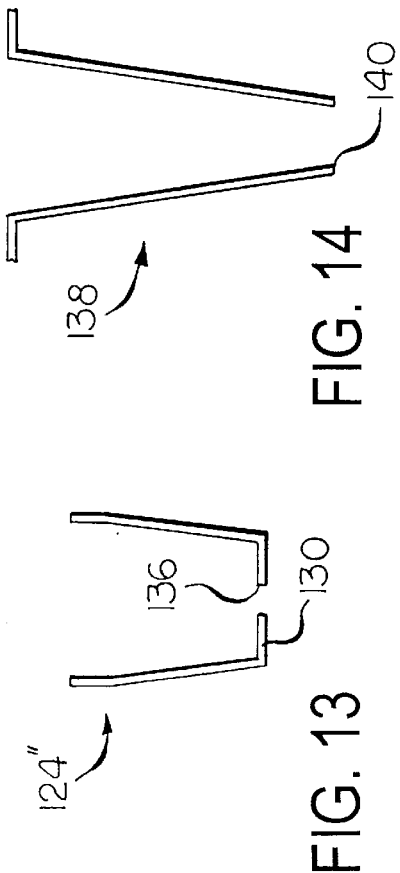
FIG. 13 is a side cross-sectional view of a container having an opening created in the closed end surface.

FIG. 1 shows the sheet 122" of containers 124" after the cutting operation, with openings 136 created in the closed end surface 130 of the containers. The sheet 122" of containers 124" is indexed to the trimming station to separate individual containers from the sheet and remove excess plastic material. FIG. 13 shows a container 124" having an opening 136 created in the closed end surface 130.

Figure 15:
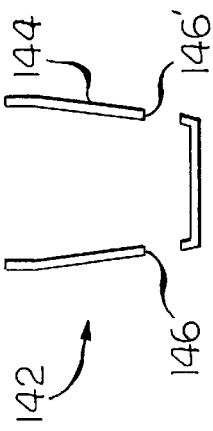
FIG. 15 is a side cross-sectional view of a container having an opening created in the side surface.
Figure 14:
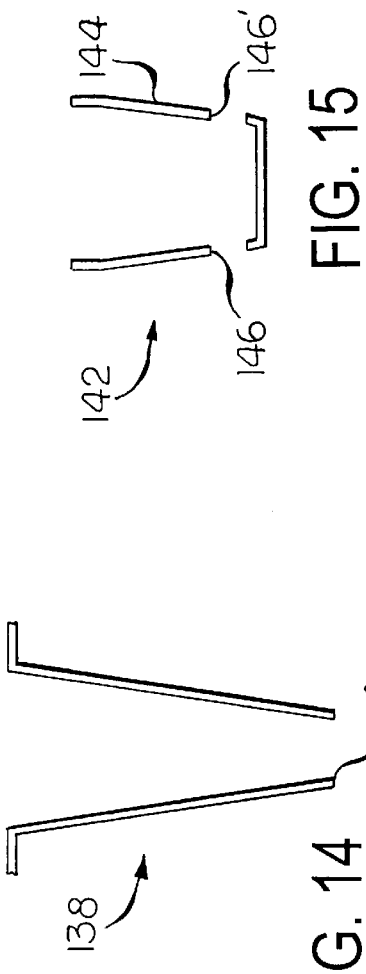
FIG. 14 is a side cross-sectional view of a container having the entire closed end surface cut off to create an opening.

As mentioned above, any desired portion of a container can be cut off to create an opening in the container. FIG. 14 illustrates a container 138 in which the entire closed end surface of the container has been cut off to create an opening 140. The container 138 may be useful, for example, as a cell in a horticultural tray which includes four such cells. FIG. 15 illustrates a container 142 in which a pair of protrusions have been cut off the side surface 144 to create a pair of openings 146, 146' in the side surface. To create such openings, a blade can be used having teeth that extend down and cut protrusions of the side surfaces of the containers. The shear plate can include channels to accommodate the teeth. Other blades having multi-plane cutting surfaces can be used to create different types of openings. An opening could also be formed in the edge of a container between the closed end surface and the side surface (not shown). Any shape, size and location of opening can be formed in the container.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, while the locating members have been illustrated as anvils, they can be any structures suitable for locating and supporting the sheet of containers for cutting openings in the containers. Preferably, the blade is adapted for cutting in both the forward and rearward directions, but the blade could also cut in a single direction. The cutting assembly 10 can also be equipped with multiple blades 72 or blades having multi-plane cutting surfaces. Other variations of the invention are also contemplated.

What is claimed is:

1. A method for producing a plurality of containers having openings comprising the steps of:
   (a) providing a sheet including a plurality of containers, each of the containers including a container surface which defines a cavity formed therein, each of the cavities including a side surface and an end surface, each of the cavities having an outwardly extending protrusion formed on at least one of the side surface and the end surface thereof;
   (b) providing a support assembly which includes a plurality of support anvils and a shear plate having a longitudinal axis, the support anvils having a shape which generally corresponds to the shape of the cavities and including portions thereof which extend into each of the cavities for supporting a substantial portion of the cavities, each of the support anvils leaving at least a portion of the protrusions unsupported; the support anvils being selectively moveable from a first non-working position, wherein the support anvils are positioned away from the shear plate, to a second working position, wherein the support anvils are received in openings provided in the shear plate and the unsupported portions of the protrusions are located above an upper surface of the shear plate, the upper surface of the shear plate defining a cutting plane;
   (c) providing a cutting member located adjacent the upper surface of the shear plate, the cutting member having a blade including an upper portion and a lower cutting portion defining a bottom edge surface, the lower cutting portion having front and rear cutting edges which allow the blade to cut in the forward and rearward directions, the cutting member being selectively movable across the upper surface of the shear plate when the support anvils are in the second working position, the cutting member having a longitudinal axis;
   (d) moving the support anvils to the second working position wherein the unsupported portions of the protrusions are located above the cutting plane of the shear plate;
   (e) providing the cutting member having the front and rear cutting edges of the blade at an angle of about 15 degrees to about 45 degrees relative to the bottom edge surface of the lower cutting portion and at an angle of about 105 degrees to about 135 degrees relative to the upper portion of the cutting member;
   (f) positioning the longitudinal axis of the cutting member at an angle of about 1 degrees to about 5 degrees from perpendicular relative to the longitudinal axis of the shear plate to thereby reduce the amount of force necessary to cut an opening in each of the containers when the cutting member is moved across the cutting plane of the shear plate; and
   (g) subsequent to steps (d)–(f) and with the unsupported portions of the protrusions located above the cutting plane of the shear plate when the support anvils are in the second working position as recited in step (d), the blade positioned as recited in step (e), and the cutting member positioned as recited in step (f), moving the cutting member in a direction parallel to the longitudinal axis of the shear plate so as to cut off at least a portion of the unsupported portions of the protrusions thereby forming an opening in each of the containers.

2. The method according to claim 1 wherein during step (g) the cutting member cuts off the entire unsupported portions of the protrusions.

3. The method according to claim 1 wherein the protrusion is formed on the side surface of the cavity.

4. The method according to claim 1 wherein the protrusion is formed on the end surface of the cavity.

5. The method according to claim 1 further including providing a means for removing the cut portions from the support assembly.

6. The method according to claim 5 wherein the means is a vacuum box connected to a vacuum source.

7. The method according to claim 5 wherein the means is a blower.

8. The method according to claim 1 wherein a plurality of sheets are provided in step (a) and the blade is reciprocatingly moved across the cutting plane of the shear plate in step (g) so as to cut off at least a portion of the unsupported portions of the protrusions of each of the associated sheets thereby forming an opening in each of the cavities.

9. A method for producing a plurality of containers having openings comprising the steps of:
   (a) providing a sheet including a plurality of containers, each of the containers including a container surface which defines a cavity formed therein, each of the cavities including a side surface and an end surface, each of the cavities having an outwardly extending protrusion formed on at least one of the side surface and the end surface thereof,
   (b) providing a support assembly which includes a plurality of support anvils and a shear plate having a longitudinal axis, the support anvils having a shape which generally corresponds to the shape of the cavities and including portions thereof which extend into each of the cavities for supporting a substantial portion of the cavities, each of the support anvils leaving at least a portion of the protrusions unsupported; the support anvils being selectively moveable from a first non-working position, wherein the support anvils are positioned away from the shear plate, to a second working position, wherein the support anvils are received in openings provided in the shear plate and the unsupported portions of the protrusions are located above an upper surface of the shear plate, the upper surface of the shear plate defining a cutting plane;
   (c) providing a cutting member located adjacent the upper surface of the shear plate, the cutting member having a blade including an upper portion and a lower cutting portion defining a bottom edge surface, the lower cutting portion having front and rear cutting edges which allow the blade to cut in the forward and rearward directions, the cutting member being selectively movable across the upper surface of the shear plate when the support anvils are in the second working position, the cutting member having a longitudinal axis;
   (d) moving the support anvils to the second working position wherein the unsupported portions of the protrusions are located above the cutting plane of the shear plate;

(e) providing the cutting member having the front and rear cutting edges of the blade at an angle relative to the bottom edge surface of the lower cutting portion and at an angle relative to the upper portion of the cutting member;

(f) positioning the longitudinal axis of the cutting member at an angle of about 1 degrees to about 5 degrees from perpendicular relative to the longitudinal axis of the shear plate to thereby reduce the amount of force necessary to cut an opening in each of the containers when the cutting member is moved across the cutting plane of the shear plate; and (g) subsequent to steps (d)–(f) and with the unsupported portions of the protrusions located above the cutting plane of the shear plate when the support anvils are in the second working position as recited in step (d), the blade positioned as recited in step (e), and the cutting member positioned as recited in step (f), moving the cutting member in a direction parallel to the longitudinal axis of the shear plate so as to cut off at least a portion of the unsupported portions of the protrusions thereby forming an opening in each of the containers.

10. The method according to claim 9 wherein during step (g) the cutting member cuts off the entire unsupported portions of the protrusions.

11. The method according to claim 9 wherein the protrusion is formed on the side surface of the cavity.

12. The method according to claim 9 wherein the protrusion is formed on the end surface of the cavity.

13. The method according to claim 9 further including providing a means for removing the cut portions from the support assembly.

14. The method according to claim 13 wherein the means is a vacuum box connected to a vacuum source.

15. The method according to claim 13 wherein the means is a blower.

16. The method according to claim 9 wherein a plurality of sheets are provided in step (a) and the blade is reciprocatingly moved across the cutting plane of the shear plate in step (g) so as to cut off at least a portion of the unsupported portions of the protrusions of each of the associated sheets thereby forming an opening in each of the cavities.

17. A method for producing a plurality of thermoformed containers having openings comprising the steps of:

(a) providing a thermoformed sheet including a plurality of containers, each of the containers including a container surface which defines a cavity formed therein, each of the cavities including a side surface and an end surface, each of the cavities having an outwardly extending protrusion formed on an end surface thereof;

(b) providing a support assembly which includes a plurality of support anvils and a shear plate having a longitudinal axis, the support anvils having a shape which generally corresponds to the shape of the cavities and including portions thereof which extend into each of the cavities for supporting a substantial portion of the cavities, each of the support anvils leaving at least a portion of the protrusions unsupported; the support anvils being selectively moveable from a first non-working position, wherein the support anvils are positioned away from the shear plate, to a second working position, wherein the support anvils are received in openings provided in the shear plate and the unsupported portions of the protrusions are located above an upper surface of the shear plate, the upper surface of the shear plate defining a cutting plane;

(c) providing a cutting member located adjacent the upper surface of the shear plate, the cutting member having a blade including an upper portion and a lower cutting portion defining a bottom edge surface, the lower cutting portion having front and rear cutting edges which allow the blade to cut in the forward and rearward directions, the cutting member being selectively movable across the upper surface of the shear plate when the support anvils are in the second working position, the cutting member having a longitudinal axis;

(d) moving the support anvils to the second working position wherein the unsupported portions of the protrusions are located above the cutting plane of the shear plate;

(e) providing the cutting members having the front and rear cutting edges of the blade at an angle relative to the bottom edge surface of the lower cutting portion and at an angle relative to the upper portion of the cutting member;

(f) positioning the longitudinal axis of the cutting member at an angle of about 1 degrees to about 5 degrees from perpendicular relative to the longitudinal axis of the shear plate to thereby reduce the amount of force necessary to cut an opening in each of the containers when the cutting member is moved across the cutting plane of the shear plate; and (g) subsequent to steps (d)–(f) and with the unsupported portions of the protrusions located above the cutting plane of the shear plate when the support anvils are in the second working position as recited in step (d), the blade positioned as recited in step (e), and the cutting member positioned as recited in step (f), moving the cutting member in a direction parallel to the longitudinal axis of the shear plate so as to cut off at least a portion of the unsupported portions of the protrusions thereby forming an opening in each of the containers.

18. The method according to claim 17 wherein during step (g) the cutting member cuts off the entire unsupported portions of the protrusions.

19. The method according to claim 17 further including providing a means for removing the cut portions from the support assembly.

20. The method according to claim 19 wherein the means is a vacuum box connected to a vacuum source.

21. The method according to claim 19 wherein the means is a blower.

22. The method according to claim 17 wherein a plurality of thermoformed sheets are provided in step (a) and the blade is reciprocatingly moved across the cutting plane of the shear plate in step (g) so as to cut off at least a portion of the unsupported portions of the protrusions of each of the associated sheets thereby forming an opening in each of the cavities.

* * * * *